Aug. 26, 1941.   F. L. G. KOLLMORGEN   2,253,497
METHOD OF MAKING DIES FOR MOLDING CONTACT LENSES
Filed Aug. 2, 1939

INVENTOR.
FREDERICK L. G. KOLLMORGEN
BY
ATTORNEY.

Patented Aug. 26, 1941

2,253,497

UNITED STATES PATENT OFFICE 2,253,497

METHOD OF MAKING DIES FOR MOLDING CONTACT LENSES

Frederick L. G. Kollmorgen, Mountain Lakes, N. J., assignor to Kollmorgen Optical Corporation, Brooklyn, N. Y., a corporation of New York Application August 2, 1939, Serial No. 287,892

4 Claims. (Cl. 76—107)

The present invention relates to a method of manufacturing dies for molding contact lenses and, more particularly, to making contact lenses of the type molded to the eyeball.

Heretofore, in the art of making contact lenses it was preferred to mold the lens directly to the eyeball. The procedure followed in the past included anesthetizing the eye and placing a plastic mass of suitable character thereon. Generally, a plastic mass of readily hardening character was employed such as a mass known in the trade under the name "Negocoll." This plastic mass was allowed to harden and after removal from the eye provided an impression of the shape of the eyeball. A replica of this hardened impression was made in plaster of Paris or some similar material. This plaster replica was sent by the oculist to the manufacturer of contact lenses and was employed in preparing a lens having suitable shape and characteristics.

This conventional procedure had a number of serious disadvantages. As is well known to those skilled in the art, the contact lens must not touch certain sensitive parts of the eye such as the cornea and the limbus. Therefore, certain changes had to be incorporated in the original replica. These changes have been difficult to execute, involved difficult and delicate operations and destroyed or injured the original plaster cast so that it was impossible to use it again. Moreover, the conventional procedure was relatively expensive. Although this difficulty was well known in the art, and from time to time suggestions and proposals were made to eliminate these disadvantages, none, as far as I am aware, of these suggestions and proposals was completely satisfactory and successful on a practical scale.

I have discovered a simple and completely satisfactory solution of the outstanding problem.

It is an object of the present invention to provide a method of making dies for molding contact lenses which eliminates these disadvantages.

It is another object of the present invention to provide a novel and improved method of manufacturing contact lenses of the type molded to the eyeball involving a few simple steps which can be readily executed within a minimum of time and at a low cost.

It is a further object of the invention to provide a method of making contact lenses involving the preparation of a plurality of casts of plastic and readily hardening materials and to provide on said casts the shape required by the properties of the human eye by means of an operation and of a tool of special character.

It is also within the contemplation of the invention to provide a contact lens which will not touch the sensitive parts of the eye including the cornea and limbus and which rests solely on the insensitive sclera of the eye.

Other and further objects of the invention will become apparent from the following description taken in conjunction with the accompanying drawing in which.

Broadly stated, according to the principles of the invention a first or primary cast is made from the eyeball by means of a suitable plastic mass in accordance with the conventional procedure. After the plastic mass has hardened, it is removed from the eye and a replica thereof is produced in plaster of Paris or some similar material. From the plaster cast, I prepare a negative mold perfectly fitting the plaster cast and therefore also fitting the contour of an eye touching it all over. Of course, a contact lens of such character would not be tolerated by the eye in view of the fact that it would exert pressure on the extremely sensitive cornea and limbus. Therefore, in accordance with my invention I hollow out the section of the replica covering the cornea and limbus by means of a tool so shaped as to remove material from the cast at the places where it would touch these extremely sensitive portions of the eye. This is accomplished by giving to the central part of the cutting edge of this tool a curvature of such radius as is required to clear the pupil of the eye for which it is intended and by giving to its marginal portions a sufficient raise to clear the limbus. I found that in this case a contact lens molded in accordance with this tool will fit the eye without touching any of the sensitive parts.

After the negative cast is so modified, I prepare a positive replica of this cast in some similar hard and plastic material. After this replica is hardened I make metallic reproductions of the cast by appropriate methods, selecting metals of high strength and melting point. I insert these dies in properly oriented position in a die press and heat them to a temperature approximating that of softened glass. A piece of softened glass of suitable optical properties is then inserted between the dies and pressure is applied, after which the finished molded contact lens may be removed from the dies and placed in an annealing oven for proper annealing.

The invention will now be more fully described in connection with the accompanying drawing.

Figure 1:
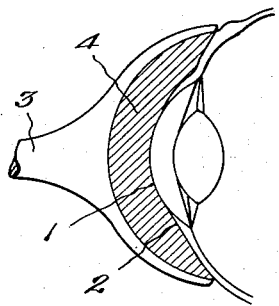
Fig. 1 illustrates a vertical sectional view of the human eye with the plastic mass placed thereon in operative position.
Figure 2:
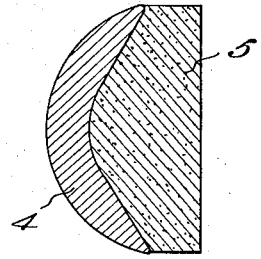
Fig. 2 depicts a similar view of the mold prepared from the eye in cooperative position with the plaster cast.
Figure 3:
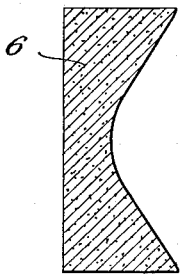
Fig. 3 shows a vertical sectional view of a negative mold prepared from the plaster cast shown in Fig. 2.
Figure 4:
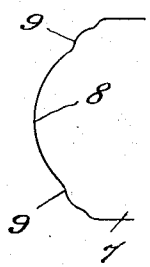
Fig. 4 is a side elevational view of a tool embodying the principles of the invention for removing predetermined amounts of material from the negative cast.

Referring to Fig. 1 of the drawing, reference characters 1 and 2 denote the sensitive portions of the eye, to wit: the cornea and the limbus, respectively. After the eye has been anesthetized, the oculist applies a suitable tool 3 against the eye, having a hollow portion containing the plastic mass 4. This plastic mass will conform to the shape of the eyeball and will retain such shape after hardening. After the plastic mass has obtained its full hardness, it is removed from the cavity of the tool 3 and a plaster cast 5 is made therefrom. This will be readily understood from Fig. 2 in which the plaster cast or replica is indicated by reference character 5. The next step in the process involves the preparation of a negative mold 6 (Fig. 3) which perfectly fits the plaster cast. As it has been explained in the foregoing, this negative cast 6 would fit the contour of the eye and would touch it all over. Obviously, a contact lens completely conforming to such negative cast would not be tolerated by the eye and would be completely useless. To eliminate pressure on the sensitive portions of the eye including the cornea and the limbus, I provide a tool 7 of special character. As it will be noted from Fig. 4, this tool may be constituted of a plate of steel or some other material having great strength and having a cutting edge corresponding to the exact curvature of the radius required to clear the pupil of the eye for which it is intended. This raised central portion is denoted in Fig. 4 by reference character 8. In addition to this, a sufficient raise is given to the marginal portions 9 of tool 7 in order to provide grooves of suitable shape in the negative mold, sufficient to clear the limbus. Clearly, a contact lens molded in accordance with this tool will fit the eye without touching the cornea or limbus and can be worn by a person without any discomfort. Tool 7 is inserted into a suitable holding device and is applied with some pressure against the negative mold. At the same time a relative rotational displacement is imparted to said tool and said mold whereby the necessary changes in the shape of the negative mold may be obtained with facility without the danger of damaging or breaking the mold.

Figure 5:
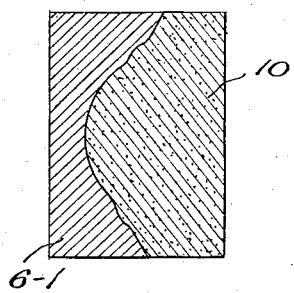
Fig. 5 depicts a vertical sectional view of the negative cast as modified by the tool shown in Fig. 4, in cooperative position with the positive cast of corresponding shape.

The next step in the manufacture of my improved contact lens involves making a positive replica of the negative mold modified by the tool in a similar hard plastic material. This positive replica or mold is denoted by reference character 10 in Fig. 5. After the replica 10 is hardened, metallic reproductions of casts 6—1 and 10 are made by conventional methods, selecting metals of suitable strength and melting point. These metallic reproductions are subsequently employed as dies for forming the contact lens from softened glass and are inserted in properly oriented position with respect to each other in a die press. The dies are then heated up to a temperature near enough to that of the softened glass to avoid chilling of the glass during the molding operation. A piece of preheated and softened glass is then inserted between the dies and the pressure is applied. Hereafter, the finished molded contact lens may be removed from the dies and may be placed in an annealing oven for proper annealing.

Figure 6:
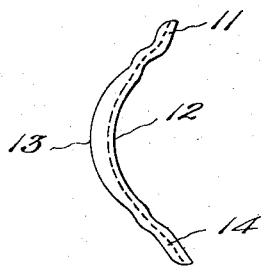
Fig. 6 shows a similar view of the finished contact lens prepared in accordance with the principles of the invention.

The appearance of the finished molded lens is shown in Fig. 6. If the foregoing operations are carried out properly, it will be found that the inner surface 12 of the contact lens, the one resting on the eye, is smooth enough to require no further polishing and will fit the eyeball without touching the cornea or the limbus so that it can be worn without any discomfort to the wearer. The outer surface 13 of the contact lens, however, will still have to be ground and polished so as to have the minimum obtainable thickness on the scleral part and a perfect optical surface of the desired and correct curvature on the part lying in front of the pupil of the eye. Dotted line 14 shows the appearance of the finished lens after the surface on the outside has been ground off and polished.

It will be noted that the present invention provides very important practical advantages. Thus, first of all the invention provides a simple, direct and inexpensive method of molding contact glasses directly to the human eye and thereby to obtain greatest optical efficiency and the maximum of comfort for the wearer.

It is also to be observed that the method of the invention makes it possible to consider the specific physiological properties of the human eye in shaping the lens and thus to avoid pressure on the sensitive portions of the eye.

Moreover, the method of the invention permits retaining all of the molds employed during the manufacturing process so that such molds may be employed for duplicating the lens at any time when that becomes necessary. The method of the invention also permits to take care of special cases in which the corneal section of the lens must be raised by an exceptionally large amount in order to clear the cornea of the eye. All that is required in this case is a correspondingly shaped tool to deepen the cut out and thus to raise the corneal section.

Although the present invention has been described in connection with a preferred embodiment thereof, variations and modifications may be resorted to by those skilled in the art without departing from the principles of the invention. I consider all of these variations and modifications to be within the true spirit and scope of the present invention as disclosed in the foregoing description and defined by the appended claims.

I claim:

1. The process of making dies for molding contact lens which comprises preparing a negative mold perfectly conforming to the outer surface of the eyeball including the cornea and the limbus, removing material from said negative mold to provide clearance for the cornea and the limbus in the molded contact lens, making a positive mold from the thus-corrected negative mold, and preparing reproductions of said corrected positive and negative molds, said reproductions forming dies adapted to cooperate with each other to shape a blank of softened glass into a molded contact lens conforming to the surface of the eyeball but out of contact with and not touching the sensitive cornea and limbus.

2. The process of making dies for molding contact lens which comprises preparing a negative mold perfectly conforming to the outer surface of the eye including the cornea and the limbus, applying with moderate pressure the cutting edge of a tool to said negative mold, said tool having a shape to provide clearance for the cornea and the limbus, causing relative rotational displacement of said tool and of said mold to remove material from said mold thereby to cause the molded contact lens to be out of contact with and not touch the sensitive cornea and limbus, making a positive mold from the thus-corrected negative mold, and preparing metallic reproductions of said corrected positive and negative mold, said metallic reproductions forming dies adapted to cooperate with each other to shape a blank of softened glass into a molded contact lens conforming to the surface of the eyeball but out of contact with and not touching the sensitive cornea and limbus.

3. The process of making dies for molding contact lens which comprises preparing a primary cast from the eyeball by means of a suitable plastic mass, preparing a replica of said primary cast, making a negative mold from said replica perfectly conforming to the outer surface of the eye including the cornea and the limbus, removing material from said negative mold to provide a clearance for the cornea and the limbus in the molded contact lens, making a positive mold from said corrected negative mold, and preparing metallic reproductions of said corrected positive and negative molds, said metallic reproductions forming dies adapted to cooperate with each other to shape a blank of softened light-refracting material into a molded contact lens conforming to the surface of the eyeball but out of contact with and not touching the sensitive cornea and limbus.

4. The process of making dies for molding contact lens which comprises preparing a primary cast from the eyeball by means of a suitable plastic mass, preparing a replica of said primary cast, making a negative mold from said replica perfectly conforming to the outer surface of the eye including the cornea and the limbus, applying the cutting edge of a tool to said negative mold with moderate pressure, said tool having a cutting edge the center portion of which has a curvature of such radius as to provide clearance for the cornea and the marginal portions of which have a sufficient raise to provide clearance for the limbus in the molded contact lens, causing rotational relative displacement of said tool and of said mold to remove material from said mold thereby to cause the molded contact lens to be out of contact with and not touch the sensitive cornea and limbus, making a positive mold from the thus-corrected negative mold, and preparing metallic reproductions of said corrected positive and negative molds, said metallic reproductions forming dies adapted to cooperate with each other to shape a blank of softened glass into a molded contact lens conforming to the surface of the eyeball but out of contact with and not touching the sensitive cornea and limbus.

FREDERICK L. G. KOLLMORGEN.